Oct. 25, 1966 | D. R. BARBER | 3,281,801

MAGNETIC CORE PULSE CIRCUIT

Filed March 15, 1963

Inventor
DONALD R. BARBER
By Philip M. Bolton
Attorney

United States Patent Office 3,281,801
Patented Oct. 25, 1966

3,281,801
MAGNETIC CORE PULSE CIRCUIT

Donald R. Barber, London, England, assignor to International Standard Electric Corporation, New York, N.Y., a corporation of Delaware Filed Mar. 15, 1963, Ser. No. 265,428
Claims priority, application Great Britain, Mar. 27, 1962, 11,627/62
19 Claims. (Cl. 340—174)

This invention relates to pulse circuits and more particularly to pulse circuits utilizing magnetic cores and transistors.

An object of this invention is to provide an improved pulse circuit employing magnetic cores and transistors which is simpler than heretofore known pulse circuits of this type both in construction and in the components employed therein.

A feature of this invention is the provision of a series of square loop magnetic cores each having two stable magnetic states, at least a first winding and a second winding on each of the cores, means for biasing each of the cores to a given one of the stable magnetic states at least during predetermined time intervals, a transistor for each of the cores, each of the transistors having a first electrode coupled to the first winding of its associated one of the cores and a second electrode coupled to the second winding of the preceding one of the cores in the series, at least one of the transistors being in a first operating condition and the others of said transistors being in a second operating condition, and means applying shift pulses to each of the first windings, the core associated with the transistor or transistors in the first operating condition having its magnetic state switched from the given one of the stable magnetic states to the other one of the stable magnetic states in response to one of the shift pulses producing a transfer pulse in its second winding to shift the first operating condition from the transistor in the first operating condition to the next one of the transistors in the series.

Another feature of this invention is the provision of at least one output winding on each of the magnetic cores to provide an output pulse when its associated core is switched.

Still another feature of this invention is the ability of the pulse circuit of this invention to be utilized as a pulse distributor, a shift register having parallel or serial feeding arrangements for the information to be stored, or as an aperiodic ring counter.

Figure 1:
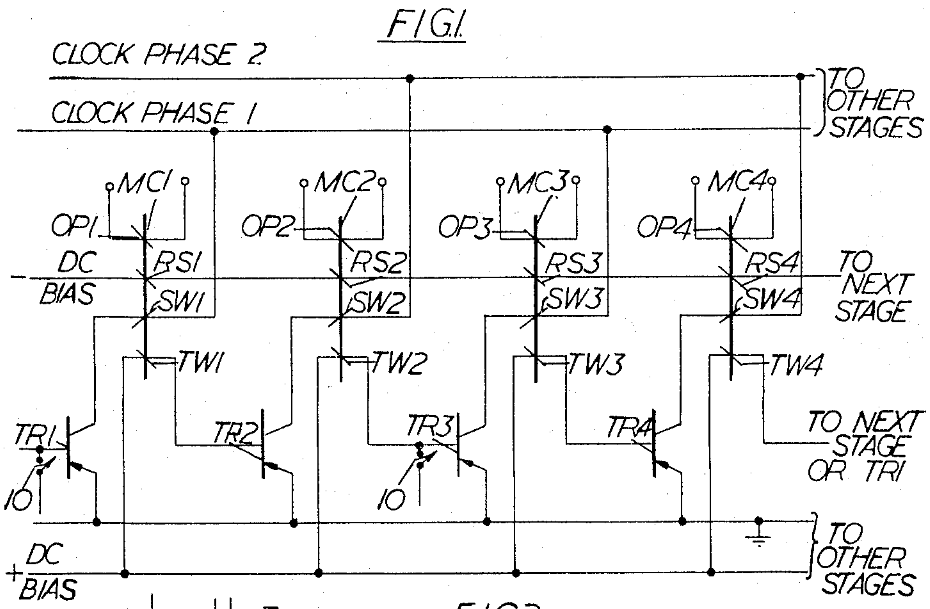
Figure 2:
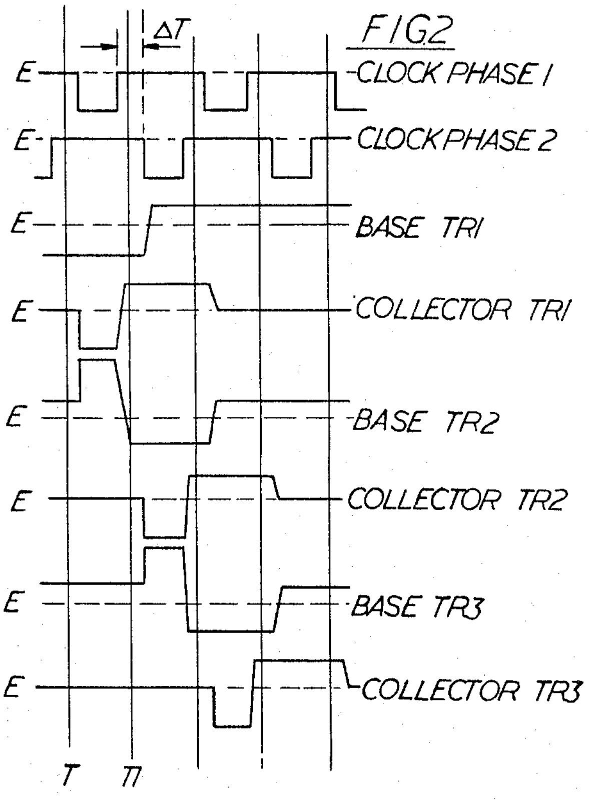

The above-mentioned and other features and objects of this invention will become more apparent by reference to the following description taken in conjunction with the accompanying drawing in which:

FIG. 1 illustrates a schematic diagram of a pulse circuit following the principles of this invention; and FIG. 2 shows the relative timing of pulses at selected points in the circuit of FIG. 1.

Referring to FIG. 1, the pulse circuit of this invention is illustrated as comprising a plurality of stages each including a magnetic core and a transistor. The pulse circuit may, of course, consist of any required number of stages, but only four stages are represented in FIG. 1 since this is adequate for descriptive purposes.

Referring to FIG. 1, magnetic cores MC1 to MC4 of ferrite or other suitable ferromagnetic material having a substantially rectangular hysteresis loop are each provided with an output winding OP, a reset winding RS, a shift winding SW, and a transfer winding TW.

Each core is shown diagrammatically as a straight rod, though in practice it will preferably comprise a toroid or other closed magnetic circuit. A winding on the core is illustrated as a short inclined line which slopes upward to the left to indicate a winding wound "reverse" and to the right to indicate a winding wound "straight." A horizontal line drawn through the intersections of the winding line with the core indicates a conductor with which the winding is in series. A current flowing from right to left through a conductor in series with a reverse winding will be assumed to produce flux from bottom to top in the core.

All the reset windings RS are connected in series to a source (not shown) of D.C. bias having a negative polarity in the example employed herein. Shift windings SW1 and SW3 are connected between the collectors of transistors TR1 and TR3, respectively, and a first source (not shown) of a train of negative clock or shift pulses. Shift windings SW2 and SW4 are connected between the collectors of transistors TR2 and TR4, respectively, and a second pulse source (not shown) of a train of similar negative clock or shift pulses, each pulse of the second train occurring midway in time between two adjacent pulses of the first shift pulse train. The transfer winding TW of each stage is connected between a source (not shown) of small positive bias and the base of the transistor in the next stage.

To explain the operation of the pulse circuit of FIG. 1, it will be assumed that at time T (FIG. 2) TR1 is saturated by a negative signal on its base. The remaining transistors are cut off by the positive bias applied to their bases, and all the cores are held in the reset condition (negative stable magnetic state) by the D.C. bias coupled to reset windings RS. At this time there is no clock pulse present and, hence, no voltage across winding SW1.

When the next negative clock pulse (phase 1) is applied to windings SW1 and SW3 of cores MC1 and MC3, it is ineffective on the third stage due to the cut-off condition of transistor TR3. However, the effect on the first stage is to cause transistor TR1, which is already saturated, to immediately conduct, as its collector is driven negative, with the result that the current flowing through SW1 switches core MC1 towards its positive stable magnetic state and a drive pulse is induced in the output winding OP1. Core MC1 switches very rapidly because it is voltage driven.

At the end of the clock pulse, core MC1 immediately resets under the action of the D.C. bias coupled to its reset winding RS1. The resetting of core MC1 induces a current in the transfer winding TW1 which opposes and overcomes the positive bias on the base of transistor TR2 and drives TR2 into saturation at time T1 (FIG. 2) ready for the next clock pulse (phase 2). When this next clock pulse arrives, core MC2 is switched and subsequently reset following a similar sequence as that described hereinabove for core MC1.

In the embodiment described above two phases of clock pulses are used in order to give the cores plenty of time to reset before the same phase of clock pulse is used again. A single phase clock pulse could be used if each core is fully reset before the end of the guard ($\Delta T$, FIG. 2) between pulses.

The pulse circuit of FIG. 1 having a single pulse input on the base of transistor TR1 will provide a plurality of output pulses in time sequence at output windings OP at the times the associated cores are switched. Thus, the pulse circuit of FIG. 1 is a pulse distributor.

The resetting of the cores may be controlled externally by switching on the reset current when required. This would allow the pulse circuit of FIG. 1 to be used as an aperiodic ring counter. In this utilization of the pulse circuit of this invention, the transfer winding TW4 is coupled to the base of transistor TR1.

Each core may have more than one output winding thereon. It will be noted that in the described embodiment the output winding of each stage is floating. This allows the pulse circuit to be used where such a condition is required, but it will be apparent that the output windings may be clamped to any required voltage level.

The circuit is a simple one using only a transistor and a magnetic core per stage, and furthermore, the transistors need not be of a high frequency type, since they are not required to switch the final output directly.

The circuit shown in FIG. 1 may be used in a shift register. A pair of adjacent stages are used for the storage and transfer of each item of intelligence. The intelligence may be passed into the shift register in parallel-fashion by means of leads connected through switches 10 in their closed position to the bases of the first transistor of each pair of stages, such as transistors TR1 and TR3. Information in the binary form is put into the shift register by applying a suitable potential to appropriate ones of the closed switches 10 to overcome the cut-off bias and drive the corresponding transistor into saturation so that on application of phase 1 shift pulse (for two phase shift pulse operation) the appropriate cores are switched to store the information. The block of inserted information is then progressed along the shift register, each item of information being transferred from the first stage to the second stage of each pair of stages under control of the phase 2 shift pulse and then into the first stage of the succeeding pair of stages under control of the phase 1 shift pulse. Single phase shift pulses may also be used.

The information may also be passed into the shift register in series fashion by opening switches 10 and successively applying a suitable potential to the base of the first transistor of the register to drive the transistor into saturation in correspondence with the desired pattern of information. The information is passed into the register by pulsing or actuating the first transistor base to the saturated condition at a frequency equal to the frequency of the phase 1 shift pulses for two phase shift pulse operation, or at half the frequency of single phase shift pulse operation.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse circuit comprising:

a series of square loop magnetic cores each having two stable magnetic states;

at least a first winding and a second winding on each of said cores;

means for biasing each of said cores to a given one of said stable states at least during predetermined time intervals;

a transistor for each of said cores, each of said transistors having a first electrode coupled to said first winding of its associated one of said cores and a second electrode coupled to said second winding of the preceding one of said cores in said series, at least one of said transistors being in a first operating condition and the others of said transistors being in a second operating condition; and means applying shift pulses to each of said first windings, the core associated with said one of said transistors having its magnetic state switched from said given one of said stable states to the other one of said stable states in response to one of said shift pulses producing a transfer pulse in its second winding to shift said first operating condition from said one of said transistors to the next one of said transistors in said series.

2. A circuit according to claim 1, wherein each of said cores includes at least one output winding to provide an output pulse upon switching of its associated core.

3. A circuit according to claim 1, wherein said transfer pulse is produced upon resetting said switched core to said given one of said stable states.

4. A circuit according to claim 3, wherein said biasing means is continuously operative and said resetting of said switched core is in response to the removal of said one of said shift pulses.

5. A circuit according to claim 3, wherein said biasing means is operative during said predetermined time intervals to control said resetting of said switched core.

6. A circuit according to claim 1, wherein alternate ones of said transistors in said series are in said first operating condition and the cores associated with each of said alternate ones of said transistors are switched in response to one of said shift pulses.

7. A circuit according to claim 1, wherein only one of said cores is switched at a time and said cores are sequentially switched along said series.

8. A circuit according to claim 1, wherein said shift pulses include a first pulse train and a second pulse train, each pulse of said second train occurring midway between two adjacent pulses of said first train; and said means applying couples said first train to said first winding of odd numbered ones of said cores and said second train to said first winding of even numbered ones of said cores.

9. A pulse circuit comprising:

a series of square loop magnetic cores each having two stable magnetic states;

at least a first winding, a second winding and at least one output winding on each of said cores;

means for biasing each of said cores to a given one of said stable states continuously;

a transistor for each of said cores, each of said transistors having a first electrode coupled to said first winding of its associated one of said cores and a second electrode coupled to said second winding of the preceding one of said cores in said series, at least one of said transistors being in a first operating condition and the others of said transistors being in a second operating condition; and means applying shift pulses to each of said first windings, the core associated with said one of said transistors having its magnetic state switched from said given one of said stable states in response to one of said shift pulses to produce an output pulse on said output winding, said core associated with said one of said transistors being reset upon removal of said one of said shift pulses to produce a transfer pulse in its second winding to shift said first operating conditions from said one of said transistors to the next one of said transistors in said series.

10. A pulse circuit comprising:

a series of square loop magnetic cores each having two stable magnetic states;

at least a first winding, a second winding and at least one output winding on each of said cores;

means for biasing each of said cores to a given one of said stable states during a predetermined time interval;

a transistor for each of said cores, each of said transistors having a first electrode coupled to said first winding of its associated one of said cores and a second electrode coupled to said second winding of the preceding one of said cores in said series, at least one of said transistors being in a first operating condition and the others of said transistors being in a second operating condition; and means applying shift pulses to each of said first windings, the core associated with said one of said transistors having its magnetic state switched from said given one of said stable states to the other one of said stable states in response to one of said shift pulses to produce an output pulse on its associated winding, said predetermined time interval for said biasing means occurring after the switching of said magnetic core to reset said switched core to produce a transfer pulse in its second winding to shift said first operating condition from said one of said transistors to the next one of said transistors in said series.

11. A pulse circuit comprising:

a series of square loop magnetic cores each having two stable states;

at least a first winding and a second winding on each of said cores;

means for biasing each of said cores to a given one of said stable states at least during predetermined time intervals;

a transistor for each of said cores, each of said transistors having a first electrode coupled to the first winding of its associated one of said cores and a second electrode coupled to the second winding of the preceding one of said cores in said series;

means coupled to said transistors to render at least one of said transistors at a first operating condition and the others of said transistors at a second operating condition; and means applying shift pulses to each of said first windings, the core associated with said one of said transistors having its magnetic state switched from said given one of said stable states to the other one of said stable states in response to one of said shift pulses producing a transfer pulse in its second winding to shift said first operating condition from said one of said transistors to the next one of said transistors in said series.

12. A pulse circuit comprising:

a series of square loop magnetic cores each having two stable magnetic states;

at least a first winding and a second winding on each of said cores;

means for biasing each of said cores to a given one of said stable states at least during predetermined time intervals;

a transistor for each of said cores having its emitter-collector path in series with the first winding of its associated core and its base connected to the second winding of the preceding one of said cores in said series, at least one of said transistors being in a first operating condition and the others of said transistors being in a second operating condition; and means applying shift pulses to each of said first windings, the core associated with said one of said transistors having it magnetic states to the other one of said one of said stable states to the other one of said stable states in response to one of said shift pulses to produce a transfer pulse upon the resetting of said switched core in its second winding to shift said first operating condition from said one of said transistors to the next one of said transistors in said series.

13. A pulse circuit according to claim 12, wherein each of said cores includes at least one output winding to provide an output pulse upon switching of its associated core.

14. A pulse circuit according to claim 12, wherein said biasing means is continuously operative and said resetting of said switched core is in response to the removal of said one of said shift pulses.

15. A circuit according to claim 12, wherein said biasing means is operative during said predetermined time intervals to control said resetting of said switched core.

16. A shaft register comprising:

a series of square loop magnetic cores each having two stable states;

at least a first winding and a second winding on each of said cores;

means for biasing each of said cores to a given one of said stable states at least during predetermined time intervals;

a transistor for each of said cores, each of said transistors having a first electrode coupled to said first winding of its associated one of said cores and a second electrode coupled to said second winding of the preceding one of said cores in said series;

means coupled to said transistors to establish a first operating condition for said transistors;

means to couple different bits of information to alternate ones of said transistors in said series to establish a second operating condition for said alternate ones of said transistors; and means applying at least one train of shift pulses to each of said first windings, the cores associated with said alternate ones of said transistors having their magnetic state switched from said given one of said stable states to the other one of said stable states in response to one shift pulse of said train of shift pulses producing a transfer pulse in its second winding to shift said second operating condition from said alternate ones of said transistors to the next ones of said transistors in said series, succeeding shift pulses of said train of shift pulses causing said bits of information to progress through said series.

17. A shift register comprising:

a series of square loop magnetic cores each having two stable magnetic states;

at least a first winding and a second winding on each of said cores;

means for biasing each of said cores to a given one of said stable states at least during predetermined time intervals;

a transistor for each of said cores having its emitter-collector path in series with the first winding of its associated core and its base connected to the second winding of preceding ones of said cores in said series;

means coupled to said transistors to establish a first operating condition for said transistors;

means to couple different bits of information to alternate ones of said transistors in said series to establish a second operating condition for said alternate ones of said transistors; and means applying at least one train of shift pulses to each of said first windings, the cores associated with said alternate ones of said transistors having their magnetic state switched from said given one of said stable states to the other one of said stable states in response to one shift pulse of said train of shift pulses producing a transfer pulse upon the resetting of said switched cores in its second winding to shift said second operating condition from said alternate ones of said transistors to the next ones of said transistors in said series, succeeding shift pulses of said train of shift pulses causing said bits of information to progress through said series.

18. A shift register comprising:

a series of square loop magnetic cores each having two stable states;

at least a first winding and a second winding on each of said cores;

means for biasing each of said cores to a given one of said stable states at least during predetermined time intervals;

a transistor for each of said cores, each of said transistors having a first electrode coupled to said first winding of its associated one of said cores and a second electrode coupled to said second winding of the preceding one of said cores in said series;

means coupled to said transistors to establish a first operating condition for said transistors;

means to couple bits of information at a given repetition rate to the first transistor in said series to establish a second operating condition for said transistor upon the occurrence of each of said bits; and means applying at least one train of shift pulses having a repetition rate equal to twice said given repetition rate to each said first windings, the core associated with said first transistor having its magnetic state switched from said given one of said stable states to the other one of said stable states in response to one shift pulse of said train of shift pulses producing a transfer pulse in its second winding to shift said second operating condition from said first transistor to the next one of said transistors in said series, succeeding shift pulses causing each bit of said bits of information to progress along said series.

19. A shift register comprising:

a series of square loop magnetic cores each having two stable magnetic states;

at least a first winding and a second winding on each of said cores;

means for biasing each of said cores to a given one of said stable states at least during predetermined time intervals;

a transistor for each of said cores having its emitter-collector path in series with the first winding of its associated core and its base connected to the second winding of preceding one of said cores in said series;

means coupled to said transistors to establish a first operating condition for said transistors;

means to couple bits of information at a given repetition rate to the first transistor in said series to establish a second operating condition for said first transistor upon the occurrence of each of said bits; and means applying at least one train of shift pulses having a repetition rate equal to twice said given repetition rate to each of said first windings, the core associated with said first transistor having its magnetic state switched from said given one of said stable states to the other one of said stable states in response to one shift pulse of said train of shift pulses producing a transfer pulse in its second winding to shift said second operating condition from said first transistor to the next one of said transistors in said series, succeeding shift pulses causing each bit of said bits of information to progress along said series.

References Cited by the Examiner

UNITED STATES PATENTS

| | | | |
|---|---|---|---|
| 2,591,406 | 4/1952 | Carter et al. | 340—174 |
| 2,955,264 | 11/1960 | Kihn et al. | 340—174 |
| 2,963,688 | 12/1960 | Hiroshi Amemlya | 340—174 |

BERNARD KONICK, *Primary Examiner.*

G. LIEBERSTEIN, *Assistant Examiner.*